US011200644B2

(12) United States Patent
Ryan et al.

(10) Patent No.: US 11,200,644 B2
(45) Date of Patent: Dec. 14, 2021

(54) VIDEO SUPER RESOLUTION METHOD

(71) Applicant: FotoNation Limited, Galway (IE)

(72) Inventors: Cian Ryan, Limerick (IE); Richard Blythman, Galway (IE)

(73) Assignee: FotoNation Limited

( * ) Notice: Subject to any disclaimer, the term of this patent is extended or adjusted under 35 U.S.C. 154(b) by 0 days.

(21) Appl. No.: 16/803,062

(22) Filed: Feb. 27, 2020

(65) Prior Publication Data

US 2021/0272247 A1 Sep. 2, 2021

(51) Int. Cl.
| G06T 7/00 | (2017.01) |
| G06T 5/00 | (2006.01) |
| G06T 5/10 | (2006.01) |
| H04N 5/232 | (2006.01) |
| G06T 5/50 | (2006.01) |

(52) U.S. Cl.
CPC ............... *G06T 5/003* (2013.01); *G06T 5/10* (2013.01); *G06T 5/50* (2013.01); *H04N 5/23232* (2013.01); *G06T 2207/10016* (2013.01); *G06T 2207/20084* (2013.01)

(58) Field of Classification Search
CPC ..... G06N 3/0454; H04N 19/523; H04N 19/59
See application file for complete search history.

(56) References Cited

U.S. PATENT DOCUMENTS

| 10,701,394 | B1* | 6/2020 | Caballero | ............... G06N 3/08 |
| 2010/0079666 | A1* | 4/2010 | Osanai | ...................... G06T 3/40 |
| | | | | 348/441 |
| 2019/0065410 | A1 | 2/2019 | Bigioi et al. | |
| 2019/0139205 | A1* | 5/2019 | El-Khamy | ........... G06K 9/6256 |
| 2019/0206026 | A1 | 7/2019 | Vemulapalli et al. | |
| 2020/0372609 | A1* | 11/2020 | Li | ......................... G06T 3/4046 |

OTHER PUBLICATIONS

Shi, Wenzhe, et al. "Real-time single image and video super-resolution using an efficient sub-pixel convolutional neural network." Proceedings of the IEEE conference on computer vision and pattern recognition. 2016. (Year: 2016).*

(Continued)

*Primary Examiner* — Li Liu
(74) *Attorney, Agent, or Firm* — KPPB LLP

(57) ABSTRACT

A video super resolution method comprises successively executing instances of a first plurality of layers (SISR) of a neural network for generating a first image (St) at a higher resolution than an input image frame (Xt); successively executing a second plurality of layers (VSR) of the neural network for generating a second image (Vt) at the higher resolution, at least one of the second plurality of layers generating intermediate output information (Ht), the second plurality of layers taking into account an output image (Yt-1) at the higher resolution generated by a previous instance of the network from a previous input image frame (Xt-1) and intermediate output information (Ht-1) generated by the second plurality of layers of the previous instance, and executing a third plurality of layers for combining the first (St) and second (Vt) images to produce an output image (Yt) for the instance of the network.

19 Claims, 7 Drawing Sheets

(56) References Cited

OTHER PUBLICATIONS

Wang, X., Chan, K.C., Yu, K., Dong, C. and Change Loy, C., "EDVR: Video restoration with enhanced deformable convolutional networks", in Proceedings of the IEEE Conference on Computer Vision and Pattern Recognition Workshops, May 7, 2019,10 pages.
Haris, M., Shakhnarovich, G, and Ukita. N, "Recurrent Back-Projection Network for Video Super-Resolution", in Proceedings of the IEEE Conference on Computer Vision and Pattern Recognition, pp. 3897-3906, Mar. 25, 2019.
Sajjadi, M.S., Vemulapalli, R. and Brown, M., 2018,"Frame-recurrent video super-resolution", in Proceedings of the IEEE 10 Conference on Computer Vision and Pattern Recognition, 2018 (pp. 6626-6634).
Fuolii, D., Gu, S. and Timofte, R., 2019, "Efficient Video Super-Resolution through Recurrent Latent Space Propagation", arXiv preprint arXiv:1909.08080, Sep. 17, 2019, 10 pages.
Haris, M., Shakhnarovich, G, and Ukita. N, "Deep Back-Projection Networks for Single Image Super-resolution", arXiv:1904.05677v1, [cs.CV], Apr. 4, 2019.
Extended European Search Report for European Application No. 21156436.4, Report Completed Jun. 21, 2021, dated Jun. 29, 2021, 13 pgs.
Batz et al., "Hybrid super-resolution combining example-based single-image and interpolation-based multi-image reconstruction approaches", Proceedings of the IEEE International Conference on Image Processing (ICIP), Quebec City, QC, Canada, Sep. 27-30, 2015, pp. 58-62.
Lim et al., "Deep Recurrent Resnet for Video Super-Resolution", Proceedings of the Asia-Pacific Signal and Information Processing Association Annual Summit and Conference (APSIPA ASC), Kuala Lumpur, Malaysia, Dec. 12-15, 2017, pp. 1452-1455.

* cited by examiner

VIDEO SUPER RESOLUTION METHOD

FIELD

The present invention relates to a video super resolution method.

BACKGROUND

Super Resolution (SR) is the process of increasing the spatial resolution of an image. Single-image super-resolution (SISR) exploits intra-frame spatial information within a given image to generate a higher resolution version of the image. Alternatively, video super resolution (VSR) uses inter-frame temporal correlations to recover higher resolution images from sequential low resolution (LR) images of the same scene. VSR is based on the premise that the fusion of sequential LR images provides additional contextual information due to subpixel shifts between frames.

Wang, X., Chan, K. C., Yu, K., Dong, C. and Change Loy, C., "EDVR: Video restoration with enhanced deformable convolutional networks", in Proceedings of the IEEE Conference on Computer Vision and Pattern Recognition Workshops, 2019, discloses video restoration based on a Pyramid, Cascading and Deformable (PCD) alignment scheme before fusing multiple frames.

While potentially producing acceptable high resolution (HR) images, the requirement to align frames prior to fusing is computationally expensive and so prohibits implementation in real-time systems.

Referring now to FIGS. 1-3, Haris, M., Shakhnarovich, G. and Ukita, N., "Recurrent Back-Projection Network (RBPN) for Video Super-Resolution", in Proceedings of the IEEE Conference on Computer Vision and Pattern Recognition, pp. 3897-3906, 2019 discloses an architecture comprising an initial feature extraction stage comprising a limited number of convolutional (conv) layers applied to a given image frame $I_t$, to produce a low resolution feature vector $L_t$. Each of a series of projection modules takes as input: a low resolution feature vector $M_{t-n}$ generated from the low resolution image frame $I_t$, a previous low resolution image frame $I_{t-n}$ as well as $F_{t-n}$, an optical flow calculated between the low resolution image frames $I_t$ and $I_{t-n}$; and a low resolution output $L_{t-n+1}$ from a temporally adjacent projection module to produce a low resolution feature vector $L_{t-n}$ and a high resolution output $H_{t-n}$. A reconstruction phase concatenates the high resolution outputs $H_{t-n}$ of the projection modules before feeding this information through a number of further convolutional layers to produce a final super-resolution image $SR_t$ for the image frame $I_t$.

As well as having to execute each of the projection modules for each image frame $I_t$, the calculation of optical flow between image frames is computationally expensive and again prohibits implementation in real-time systems.

FIG. 4 which is taken from Sajjadi, M. S., Vemulapalli, R. and Brown, M., 2018, "Frame-recurrent video super-resolution (FRVSR)", in Proceedings of the IEEE Conference on Computer Vision and Pattern Recognition (pp. 6626-6634) involves the utilization and propagation of the previous super-resolved estimate $I_{t-1}^{est}$ to subsequent timesteps. However, the FRVSR network is again based on explicitly determining warping between successive frames and so is computationally prohibitive for real-time systems.

Referring to FIG. 5, Fuoli, D., Gu, S. and Timofte, R., 2019, "Efficient Video Super-Resolution through Recurrent Latent Space Propagation", arXiv preprint arXiv: 1909.08080, referred to as RLSPN, utilizes both past $(X_{t-1})$ and future frames $(X_{t+1})$ which naturally improves performance for a given frame $(X_t)$, but is not viable for real-time super-resolution.

SUMMARY

According to the present invention there is provided a video super resolution method according to claim 1.

In a further aspect, there is provided a neural network image processing apparatus arranged to successively acquire a plurality of input image frames, the apparatus being configured to perform the method of claim 1 on each of said plurality of image frames.

In a still further aspect there is provided a computer program product comprising a computer readable medium on which computer readable instructions comprising a network configuration and weight information for at least a first, second and third plurality of layers, so that when executed cause one or more processors to perform the steps of claim 1.

Embodiments of the present invention integrate a recurrent multi-image (VSR) network and a static single-image super-resolution (SISR) network drawing from the benefits of both. The SISR network focuses on recovering information from a reference input frame only, while information is propagated recurrently through the VSR network to take into account multiple past frames. Details extracted from the VSR network are combined with the high resolution SISR network output to exploit information not contained in the reference frame, enabling the realistic recovery of high-frequency detail. Thus, access to information generated from previous frames augments the performance of the SISR, when available.

The contribution from the VSR network to the high resolution (HR) output image will be low when there is little correlation between a frame and previous frames, for example, for the first frame of a new scene. In this case, the network reduces to SISR which can still generate additional detail to provide a HR estimate.

Embodiments therefore improve redundancy relative to networks that rely only on previous frames.

Hidden latent-state feature maps $(H_t)$ are propagated forward over time, enabling the network to efficiently model temporal dependencies between frames. The previous super-resolution (SR) estimate $(Y_{t-1})$ is also passed over time, containing high-frequency detail and implicit information from multiple previous low-resolution (LR) frames. This approach assimilates previous frame information without the additional computational costs typically required.

Reference input frames $(X_t)$ are only processed at the timestep they are received, with information from previous timesteps being passed recurrently.

So, whereas for example, RBPN of FIGS. 1-3 typically takes into account up to 6 previous frames by processing each previous frame repetitively at each timestep, embodiments of the present invention can take into account information from at least as many previous frames without repeated image processing.

Embodiments are not restricted by the number of input LR frames used. Information can flow from any number of previous frames. The network can learn and store information from a large range of previous frames.

Embodiments incorporate information from previous frames without motion compensation or computing optical flow.

BRIEF DESCRIPTION OF THE DRAWINGS

Embodiments of the invention will be described, by way of example, with reference to the accompanying drawings, in which.

DESCRIPTION OF THE EMBODIMENT

Figure 1:
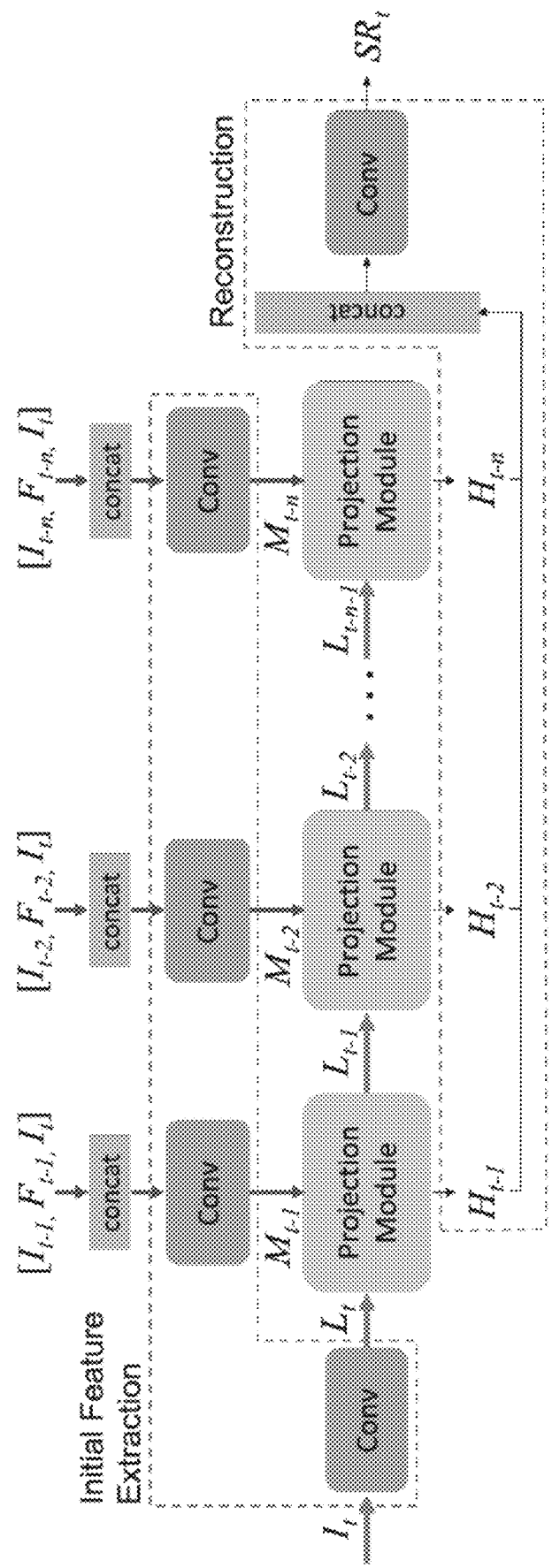
FIG. 1 shows a conventional Recurrent Back-Projection Network (RBPN)
Figures 2, 3:
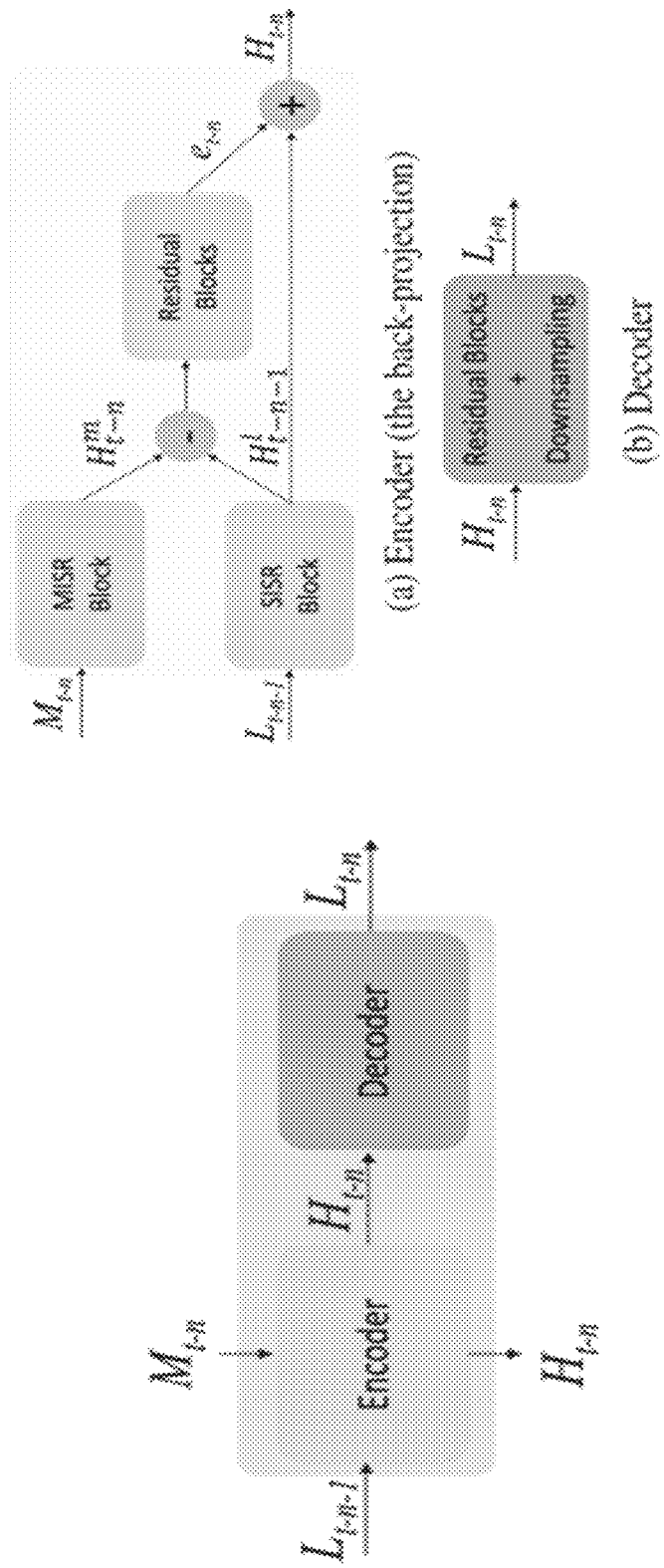
FIG. 2 shows the RBPN Projection module of FIG. 1 in more detail.
FIG. 3 shows the encoder and decoder of the RBPN projection module of FIG. 2 in more detail.
Figure 4:
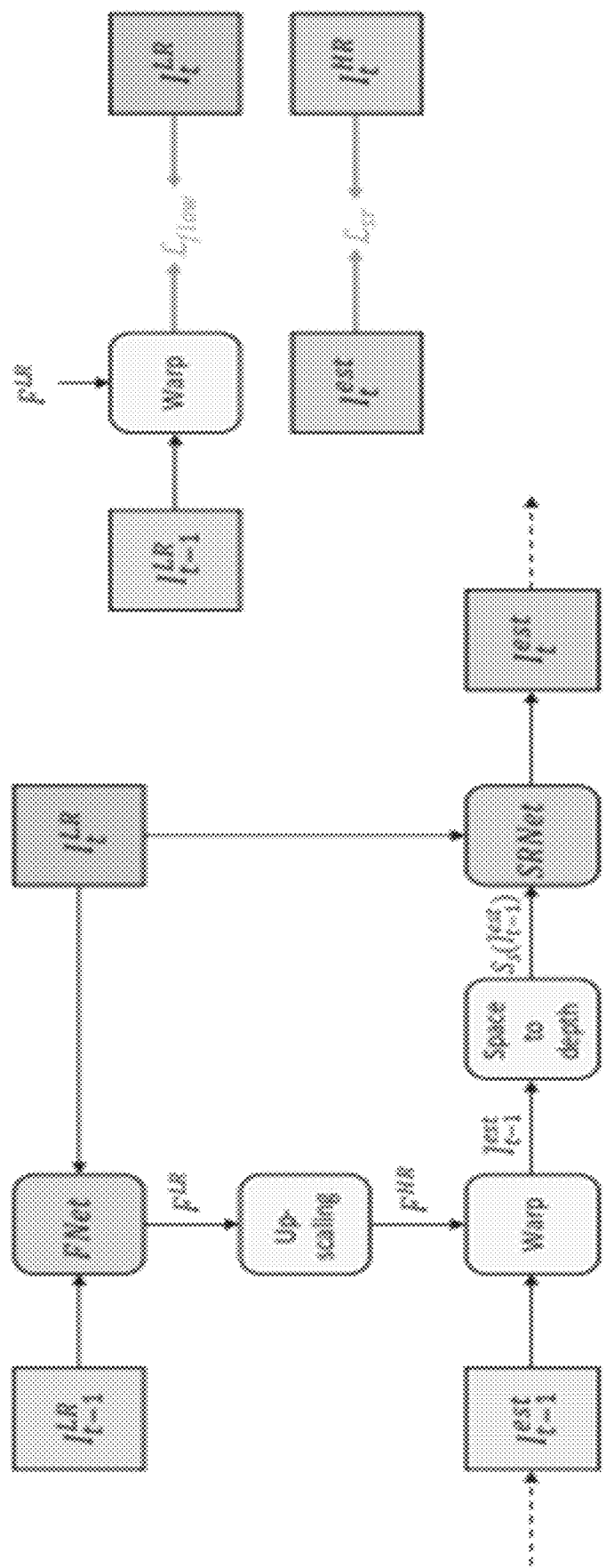
FIG. 4 shows a conventional Frame-Recurrent (FR) Video Super-Resolution (VSR) Network.
Figure 5:
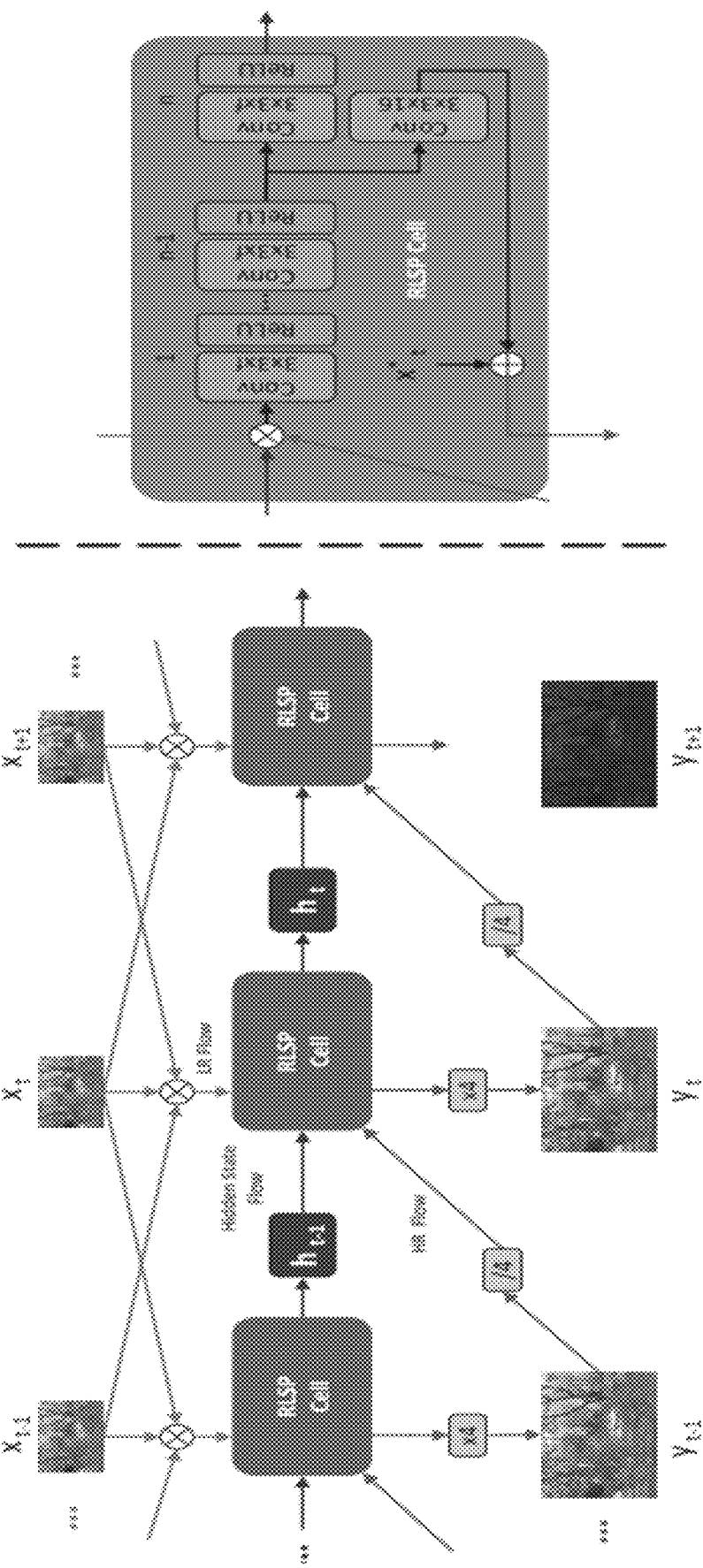
FIG. 5 shows a conventional Recurrent Latent Space Propagation Network (RLSPN)
Figure 6:
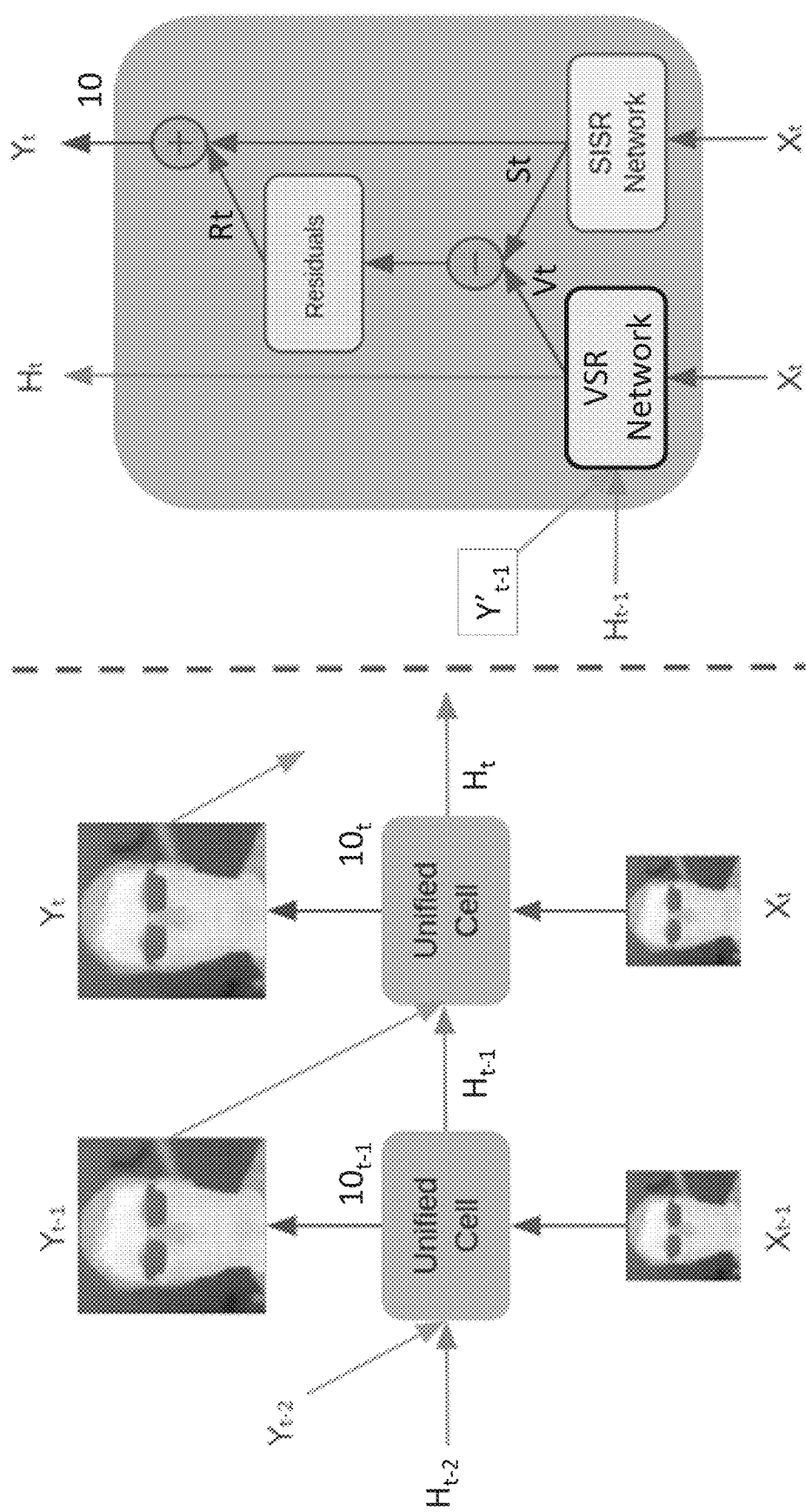
FIG. 6 shows, on the left, interconnections between respective instances of a network according to an embodiment of the present invention for generating super-resolution images ($Y_t$, $Y_{t-1}$) from reference frames ($X_t$, $X_{t-1}$) and, on the right, shows the architecture of the network in more detail.

Referring now to FIG. 6, embodiments of the present invention are based on a network 10, respective instances of which such as $10_t$ are provided with a low resolution reference frame $X_t$ to produce a high-resolution output $Y_t$. Typically the reference frame $X_t$ comprises an RGB image frame having 3 channels, one for each colour plane. It will be appreciated nonetheless that other colour formats for example, a YCC, YUV or LAB space can also be used, each also providing 3 channels and indeed, the invention can be employed with single channel intensity only images, for example, monochrome images provided from infra-red cameras.

In one embodiment, a scaling factor of 2 is used so that each pixel of the reference frame $X_t$ corresponds with 2×2 pixels of the high-resolution output $Y_t$.

The network 10 comprises a video super-resolution (VSR) network component as well as a single-image super-resolution (SISR) component each of which are provided with the reference frame $X_t$ as input and which combine as a unified cell.

The VSR network produces a high-resolution feature map $V_t$ which is combined with a high-resolution output $S_t$ from the SISR to provide the high-resolution output $Y_t$. The feature map $V_t$ and the high-resolution output $S_t$ will typically have the same number of channels as the high-resolution output, e.g. 3 channels.

Figure 7:
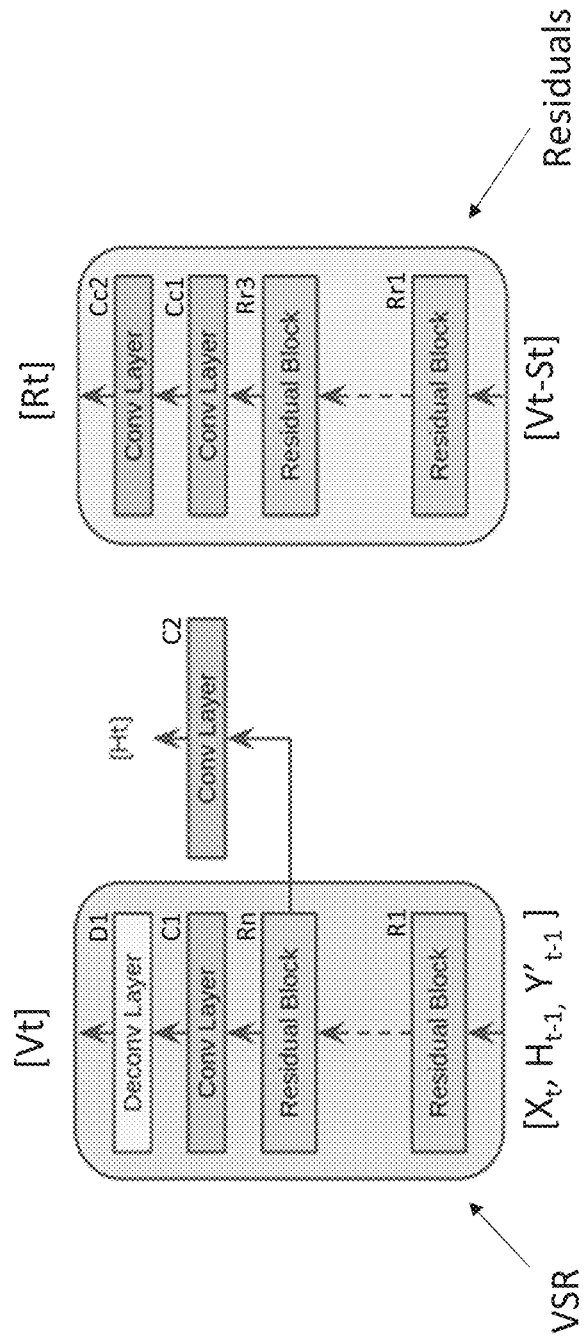
FIG. 7 shows in more detail the VSR and residuals networks of FIG. 6.

Referring now to FIG. 7, in one implementation, the VSR network comprises a series of N residual blocks R1 . . . Rn, for example, N=5, followed by a convolution layer C1 and a deconvolution layer D1 which upsamples the output of the convolutional layer C1 following the Nth residual Block and maps the feature maps to the 3 channel high-resolution space Vt.

In the embodiment, each residual block R1 . . . Rn receives 32 channels of low-resolution information, i.e. at the same resolution as the input frame $X_t$, and provides a set of 32 feature maps.

The output of the Nth residual block is fed through the convolutional layer C1 and the deconvolutional layer D1 to upsample the 32 low resolution feature maps provided from the Nth residual block to generate the 3-channel high resolution output $V_t$.

In alternative implementations, rather than a deconvolutional layer D1, pixel shuffle could be used to provide the high-resolution output $V_t$.

As is known, residual blocks can comprise a batch normalization layer followed by one or more convolutional layers with the output of the last convolutional layer being aggregated with the input of the residual block. In some embodiments of the present invention, batch normalization is not used as it can deteriorate the accuracy of the output. An activation function, such as ReLU or preferably PReLU, can be applied either to the output of the last convolutional layer before aggregation or after aggregation. Typical kernel sizes of the convolutional layers are 3×3 and in one example, 32 feature maps can be processed within each layer. In other embodiments, 64 maps could be used. Each convolutional layer within each residual block comprises of a 3×3 filter outputting 32 feature maps.

Separately, the output of the Nth residual block Rn is also provided to a separate convolutional layer C2 which provides a set of 32 low resolution latent space feature maps $H_t$. The $H_t$ feature maps are passed to a subsequent instance of the VSR network where they are referenced as $H_{t-1}$.

Thus, the initial input to any instance of the VSR network comprises: the reference image $X_t$ (3 channels); the previous latent space features maps $H_{t-1}$ (32 channels); and the previous high-resolution super-resolved estimate $Y_{t-1}$. In embodiments where a scaling factor of 2 is used, the 3 high resolution channels comprising $Y_{t-1}$ are downscaled to the resolution of the input image and increased in depth to provide $Y'_{t-1}$ comprising 12 low resolution channels. These result in 3+32+12=47 input channels.

The transformation of the previous high-resolution output ($Y_{t-1}$) to low-resolution (LR) space i.e. the same resolution as the reference frame ($X_t$) can be performed, for example, using space-to-depth re-shuffling, for example, as available in Tensorflow. Using this technique, high spatial, relatively lower depth information of the previous estimate ($Y_{t-1}$) is converted into lower spatial but relatively high depth (more channels) information $Y'_{t-1}$, so preserving the information from the previous estimate, but enabling it to be combined with the low resolution reference frame ($X_t$) information and the hidden latent-state feature map ($H_{t-1}$) from the previous instance of the VSR network before being provided as input to the VSR network.

Although not shown, the combined 47 channels are reduced in number to 32 before being provided to the $1^{st}$ residual block R1 of the VSR network.

Similarly, although not shown, there may also be additional skip connections between layers of the VSR network.

It is the provision of the output $Y'_{t-1}$ and latent space feature map $H_{t-1}$ from a previous instance of the network at the same resolution as the input frame $X_t$ which causes any given instance of the VSR network to operates in a recurrent manner.

In one embodiment, the input information $X_t$, $H_{t-1}$ and $Y'_{t-1}$ for the VSR network are combined by concatenation. However, other methods of combination such as aggregation or convolution could also be used.

As mentioned, the VSR network is recurrent, propagating information in latent-space and via recurrent frame estimates. Its output comprises a high-resolution (HR) feature map $V_t$ that is later combined with the output from the SISR network.

Separately, instance of the SISR network concentrates on the reference frame $X_t$ only. Each instance produces as output a HR feature map $S_t$ to be combined with the high resolution VSR module output $V_t$.

In one embodiment, a Deep Back-Projection Network (DBPN) such as disclosed by Muhammad Haris, Greg Shakhnarovich, and Norimichi Ukita, "Deep Back-Projection Networks for Single Image Super-resolution", arXiv: 1904.05677v1, [cs.CV], 4 Apr. 2019 is used for the SISR, however, it will be appreciated that any SISR network can be employed.

It will be appreciated that the VSR network utilizes information from previous frames that exhibit sub-pixel shifts and thus, additional information. By finding residuals between the outputs $S_t$ and $V_t$ of the SISR and VSR network, information held in the VSR features and not possessed in SISR features can be extracted.

Thus, in the example of FIGS. 6 and 7, the output $S_t$ from the SISR network is subtracted from the output $V_t$ of the VSR network before being provided to an additional Residuals network comprising a series of residual blocks. (In other embodiments $V_t$ could be subtracted from $S_t$.) FIG. 7 shows an exemplary residuals network comprising 3 residuals blocks Rr1 . . . Rr3 followed by two convolutional layers Cc1, Cc2 to produce a high-resolution residual image $R_t$. In alternative implementations, Vt and St could be combined using other techniques such as concatenation followed by convolution.

Referring back to FIG. 6, the residual image $R_t$ is added back to the SISR output $S_t$ to produce the final high-resolution output $Y_t$ for the instance of the network 10 for frame $X_t$. Again in alternative implementations, Rt and St could be combined using other techniques such as concatenation followed by convolution.

It will be appreciated that if no information was available from previous frames, or the SISR network estimated information that may have been available, then the input to the Residuals network would be zero.

It will be appreciated that variations of the above described embodiment are possible.

For example, alternatives to the residual blocks R1 . . . Rn of FIG. 7 are possible and also, it is not essential that hidden layer information is drawn from only one layer of a previous instance of the VSR network. Thus, referring to FIG. 8, rather than the principally residuals-based network of FIG. 7, each instance of the VSR network could include one or more LSTM-UNet type network layers L1, L2. In this case, reference frame $X_t$ and the downsampled previous high-resolution estimate $Y'_{t-1}$ are concatenated before being provided to a first LSTM layer L1.

Figure 9:
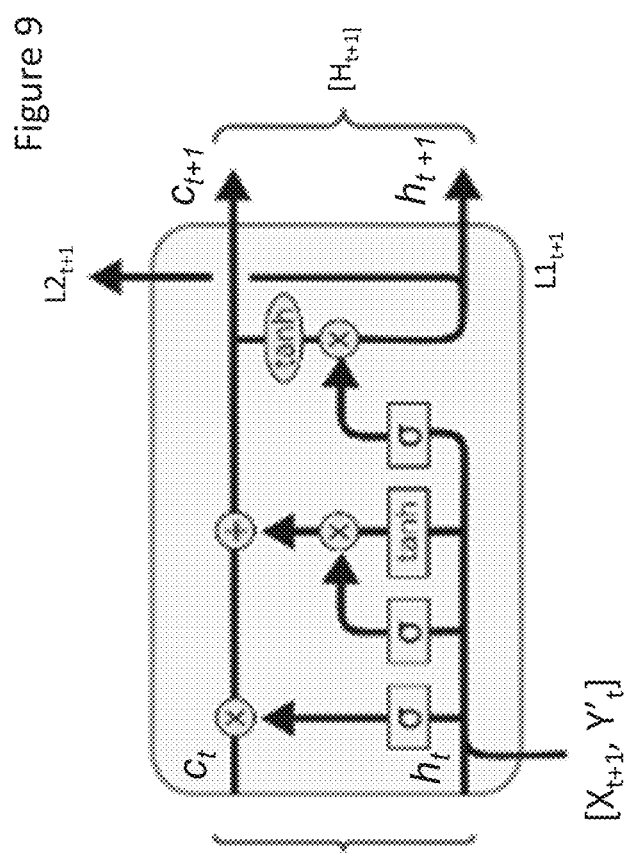
FIG. 9 shows a Long Short-Term Memory (LSTM) layer of the network of FIG. 8 in more detail.

FIG. 9 shows in detail the components of an instance of a first LSTM-UNet type network layer for processing frame $X_{t+1}$ being fed with hidden state information $[H_t]$ from a corresponding layer of a previous instance of VSR network processing frame $X_t$.

In the embodiment, both the updated candidate information h and the cell state information c produced by an instance of LSTM layer L1 are combined to provide hidden state information $[H_t]$ provided to a corresponding LSTM layer in a subsequent instance of the VSR network.

Figure 8:
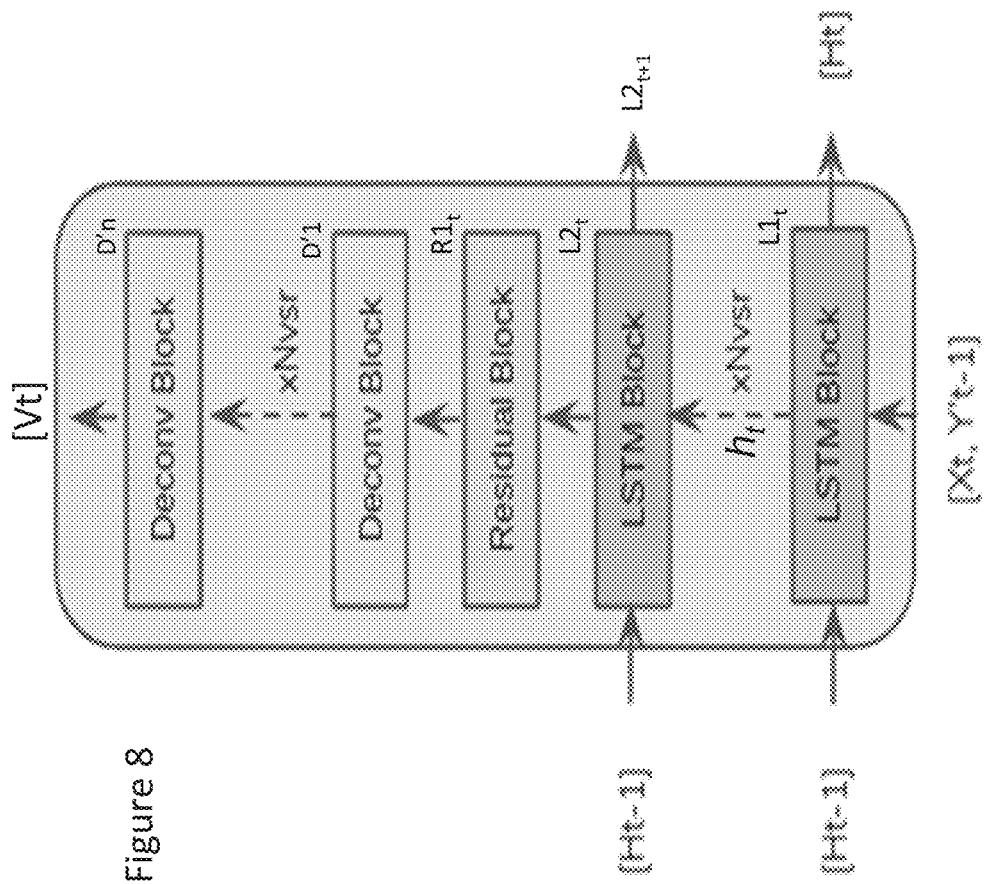
FIG. 8 shows a VSR network according to an alternative embodiment of the invention.

In the embodiment of FIG. 8, the output h of LSTM layer L1 is provided as input to a second LSTM layer L2. Again, a layer $L2_t$ processing frame $X_t$ receives hidden state information $[H_{t-1}]$ from a corresponding LSTM layer in the previous instance of the VSR network and similarly provides its updated candidate information $h_t$ and the cell state information $c_t$ to a corresponding LSTM layer $L2_{t+1}$ in a subsequent instance of the VSR network. As such, the hidden state information passed from one instance of VSR network to another is drawn from the outputs of two layers.

In the embodiment of FIG. 8, the second LSTM layer L2 is followed by a residuals block R1 whose output is then passed through a succession of deconvolution layers D'1 . . . D'n where it is upsampled to provide the high resolution output $[V_t]$ which can be combined as before with the high-resolution output $S_t$ from the SISR network to provide the final high resolution estimate $Y_t$.

The layers L1, L2, R1, D'1 . . . D'n effectively form and encoder-decoder with the LSTM blocks L1, L2 downsampling, but deepening the input, and the deconvolution layers D'1, D'n upsampling the encoded information to the required resolution for $V_t$.

Although not shown, there may also be additional skip connections summing the output of the LSTM blocks L1, L2 with the output of the corresponding upsampling blocks D'1 . . . D'n.

Networks according to embodiments of the present invention can be executed on a variety of platforms including general purpose processors, reduced instruction set (RISC) processors of the type available from ARM Holdings, multi-processor cores or a dedicated neural network multi-processor core such as disclosed in US 2019/065410 (Ref: FN-618-US), the disclosure of which is incorporated herein by reference. In particular, utilizing multi-processor cores enables instances of the VSR and SISR networks to execute in parallel so reducing system latency.

The invention claimed is:

1. A video super resolution method comprising:
executing recurring instances of a neural network on respective input image frames, said executing comprising:
successively executing instances of a first plurality of layers of a single-image super-resolution component (SISR) of the neural network for generating a first image (St) at a higher resolution than an input image frame (Xt) based on input image frame information;
successively executing a second plurality of layers of a video super-resolution component (VSR) of the neural network for generating a second image (Vt) at said higher resolution than the input image frame (Xt) based on the input image frame information, at least one of the second plurality of layers generating intermediate output information (Ht), the second plurality of layers taking into account an output image (Yt−1) at said higher resolution generated by a previous instance of the neural network from a previous input image frame (Xt−1) and intermediate output information (Ht−1) generated by the second plurality of layers of the previous instance; and
executing a third plurality of layers for combining said first (St) and second (Vt) images to produce an output image (Yt).

2. The method of claim 1 wherein said second plurality of layers comprises at least one residual layer followed by at least one deconvolutional layer.

3. The method of claim 2, wherein said second plurality of layers comprises at least one convolutional layer between said at least one residual layer and said at least one deconvolutional layer.

4. The method of claim 3 comprising taking said intermediate output information from an output of at least one of said at least one residual layers.

5. The method of claim 4 further comprising providing said output of at least one of said at least one residual layers as an input to a convolutional layer, an output of said convolutional layer comprising said intermediate output information.

6. The method of claim 1 wherein said second plurality of layers comprises at least one Long Short-Term Memory (LSTM) layer.

7. The method of claim 6 further comprising taking said intermediate output information from an output of at least one of said at least one LSTM layers.

8. The method of claim 7 wherein said output comprises each of an updated candidate information and cell state information produced by said at least one of said at least one LSTM layers.

9. The method of claim 6 wherein said second plurality of layers comprises one or more deconvolutional layers following said at least one Long Short-Term Memory (LSTM) layer.

10. The method of claim 9 wherein said second plurality of layers includes a residual layer between said at least one Long Short-Term Memory (LSTM) layer and said one or more deconvolutional layers.

11. The method of claim 1 wherein said successively executing instances of said
first plurality of layers (SISR) and successively executing said second plurality of layers (VSR) are performed either in sequence or in parallel.

12. The method of claim 1 comprising subtracting said first image (St) from said second image (Vt) before executing said third plurality of layers.

13. The method of claim 1 wherein said third plurality of layers comprises at least one residual layer.

14. The method of claim 13, wherein said third plurality of layers comprises at least one convolutional layer following said at least one residual layer.

15. The method of claim 1 further comprising adding an output of said third plurality of layers to said first image to provide said output image (Yt).

16. The method of claim 1 further comprising downsampling and deepening said output image (Yt−1) at said higher resolution generated by a previous instance of the neural network to provide an image (Y't−1) at the same resolution as said input image frame.

17. The method of claim 16 further comprising concatenating said input image frame, said downsampled output image and said intermediate output information (Ht−1) generated by the second plurality of layers of the previous instance before providing said concatenated information as input to said second plurality of layers.

18. The method of claim 17 further comprising matching a number of channels of said concatenated information with a number of channels of said intermediate output information before executing said second plurality of layers.

19. A computer program product comprising a non-transitory computer readable medium on which computer readable instructions comprising a network configuration and weight information for at least a first, second and third plurality of layers, so that when executed cause one or more processors to
successively execute instances of the first plurality of layers of a single-image super-resolution component (SISR) of the neural network for generating a first image (St) at a higher resolution than an input image frame (Xt) based on input image frame information;
successively execute the second plurality of layers of a video super-resolution component (VSR) of the neural network for generating a second image (Vt) at said higher resolution than the input image frame (Xt) based on the input image frame information, at least one of the second plurality of layers generating intermediate output information (Ht), the second plurality of layers taking into account an output image (Yt−1) at said higher resolution generated by a previous instance of the neural network from a previous input image frame (Xt−1) and intermediate output information (Ht−1) generated by the second plurality of layers of the previous instance; and
execute the third plurality of layers for combining said first (St) and second (Vt) images to produce an output image (Yt).

* * * * *